(12) United States Patent
Bernardini et al.

(10) Patent No.: US 10,206,372 B2
(45) Date of Patent: Feb. 19, 2019

(54) SYSTEM AND METHOD FOR AUTOMATICALLY DETECTING THE PRESENCE OF CAGES IN THE SHELF OF A FACILITY

(71) Applicant: TECNIPLAST S.P.A., Buguggiate (IT)

(72) Inventors: Pietro Bernardini, Crosio Della Valle (IT); Giorgio Rosati, Milan (IT); Alessandro Rigamonti, Gallarate (IT)

(73) Assignee: Tecniplast S.P.A., Buguggiate (IT)

( * ) Notice: Subject to any disclaimer, the term of this patent is extended or adjusted under 35 U.S.C. 154(b) by 209 days.

(21) Appl. No.: 14/765,131

(22) PCT Filed: Jan. 30, 2014

(86) PCT No.: PCT/IB2014/058665
§ 371 (c)(1),
(2) Date: Jul. 31, 2015

(87) PCT Pub. No.: WO2014/118727
PCT Pub. Date: Aug. 7, 2014

(65) Prior Publication Data
US 2015/0359189 A1 Dec. 17, 2015

(30) Foreign Application Priority Data

Jan. 31, 2013 (IT) .............................. MI2013A0136
Mar. 26, 2013 (IT) .............................. MI2013A0456

(51) Int. Cl.
*A01K 1/03* (2006.01)
*A01K 1/00* (2006.01)
*A01K 29/00* (2006.01)

(52) U.S. Cl.
CPC ............ *A01K 1/031* (2013.01); *A01K 1/0047* (2013.01); *A01K 29/005* (2013.01)

(58) Field of Classification Search
CPC ..... A01K 1/031; A01K 29/005; A01K 1/0047
(Continued)

(56) References Cited

U.S. PATENT DOCUMENTS

| 4,010,563 A | * | 3/1977 | Schwindt | ............. A01K 11/001 40/301 |
| 5,287,414 A | * | 2/1994 | Foster | ................ G06K 7/10079 235/383 |

(Continued)

FOREIGN PATENT DOCUMENTS

FR 2961605 A1 * 12/2011 ........... A01K 11/008

OTHER PUBLICATIONS

PCT International Search Report and Written Opinion corresponding to PCT/IB2014/058665, dated Jan. 30, 2014 (dated Jun. 4, 2014).

*Primary Examiner* — Lisa L Tsang
(74) *Attorney, Agent, or Firm* — LeClairRyan PLLC

(57) ABSTRACT

A system for automatically detecting the presence of a cage or tray for containing laboratory animals in a specific position of a facility shelf and a method for managing the data relating to the cage, implemented by the system, particularly advantageous for the laboratory technician. In particular, the system is composed of a shelf comprising a plurality of devices designed to detect the position in the facility and the ID of a cage, a central control unit designed to process, through software, the information received in order to offer the operator the possibility of tracking and managing, by means of a database, the whole facility. Numerous other functions of the system are included, such as the function designed to detect and notify, visually or through the software, the correct positioning of a cage in the shelf.

12 Claims, 18 Drawing Sheets

(58) Field of Classification Search
USPC .............. 119/417–19, 445; 340/573.1, 573.2
See application file for complete search history.

(56) References Cited

U.S. PATENT DOCUMENTS

| | | | | |
|---|---|---|---|---|
| 6,693,543 | B1* | 2/2004 | Stephenson | G08B 21/22 |
| | | | | 248/220.22 |
| 7,126,471 | B2* | 10/2006 | Ahmed | G01S 13/825 |
| | | | | 119/455 |
| 9,183,738 | B1* | 11/2015 | Allen, Sr. | A61B 5/6807 |
| 2002/0069834 | A1* | 6/2002 | Deitrich | A01K 1/031 |
| | | | | 119/419 |
| 2002/0190845 | A1* | 12/2002 | Moore | G06K 7/10336 |
| | | | | 340/10.3 |
| 2003/0131802 | A1* | 7/2003 | Murray | A01K 1/031 |
| | | | | 119/455 |
| 2005/0024211 | A1* | 2/2005 | Maloney | G06K 7/10079 |
| | | | | 340/572.1 |
| 2005/0101843 | A1* | 5/2005 | Quinn | G01K 13/002 |
| | | | | 600/300 |
| 2007/0040682 | A1* | 2/2007 | Zhu | G08B 13/2462 |
| | | | | 340/572.1 |
| 2009/0293815 | A1* | 12/2009 | Coiro, Sr. | A01K 1/031 |
| | | | | 119/417 |
| 2012/0085291 | A1 | 4/2012 | Conger et al. | |
| 2014/0232381 | A1* | 8/2014 | Bernardini | G01R 29/0814 |
| | | | | 324/228 |

* cited by examiner

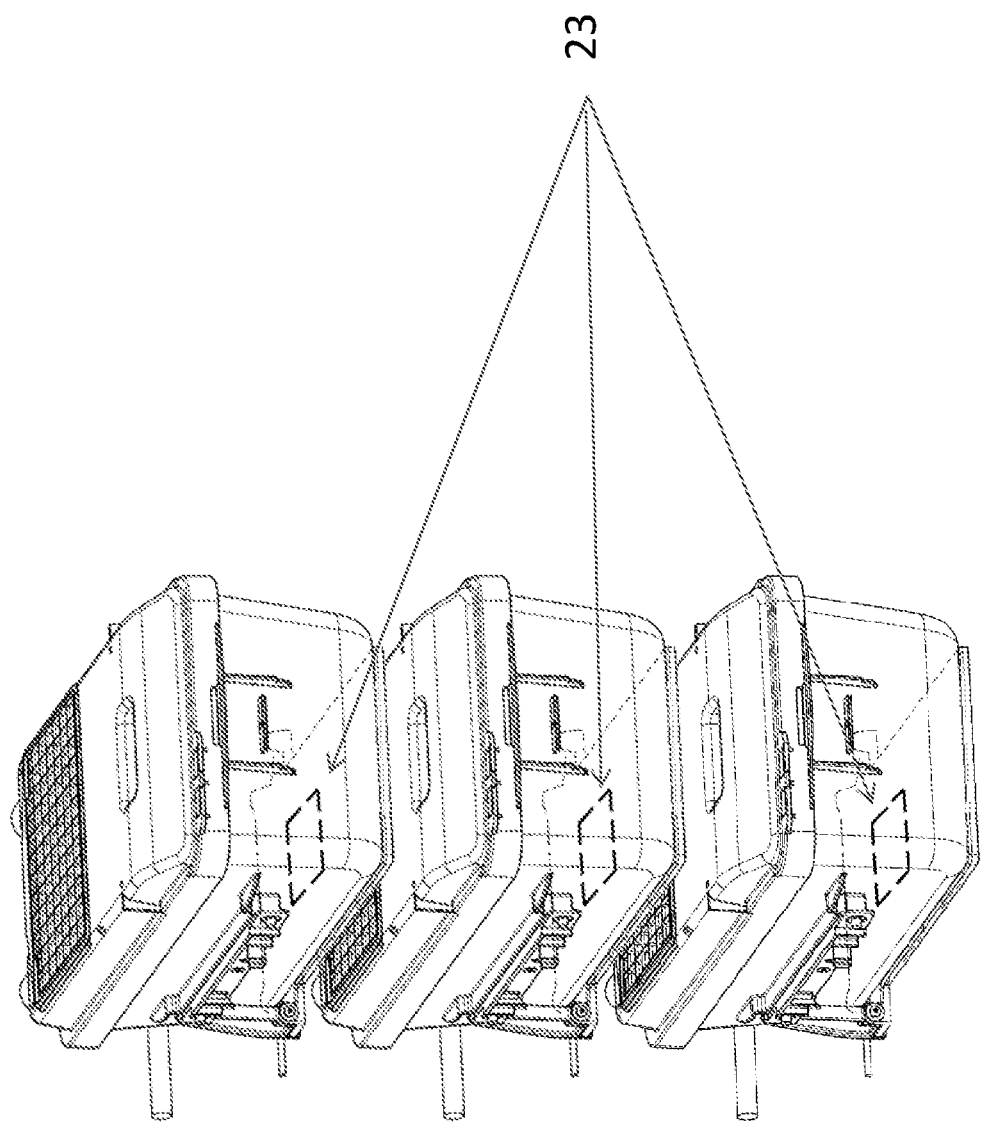

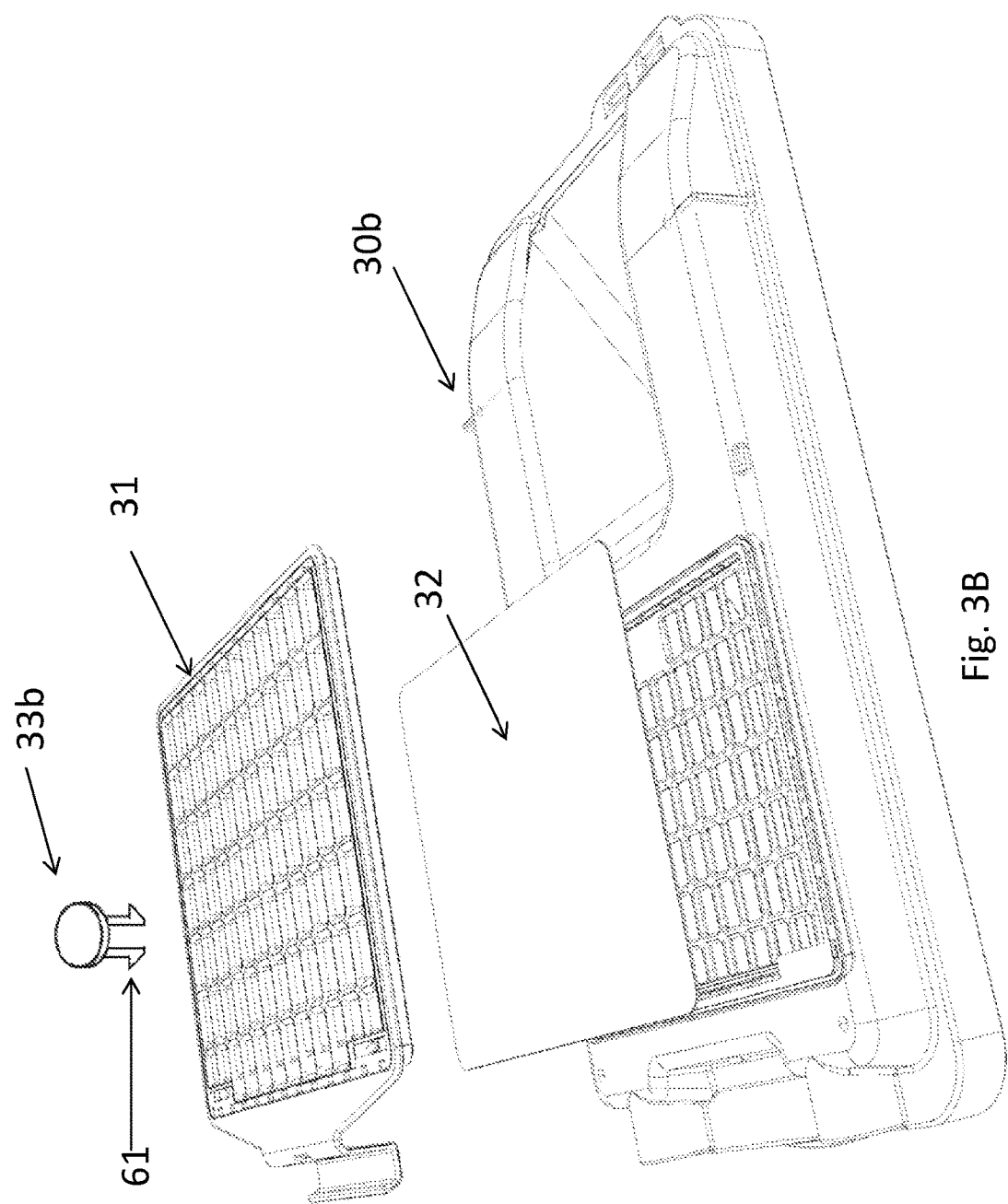

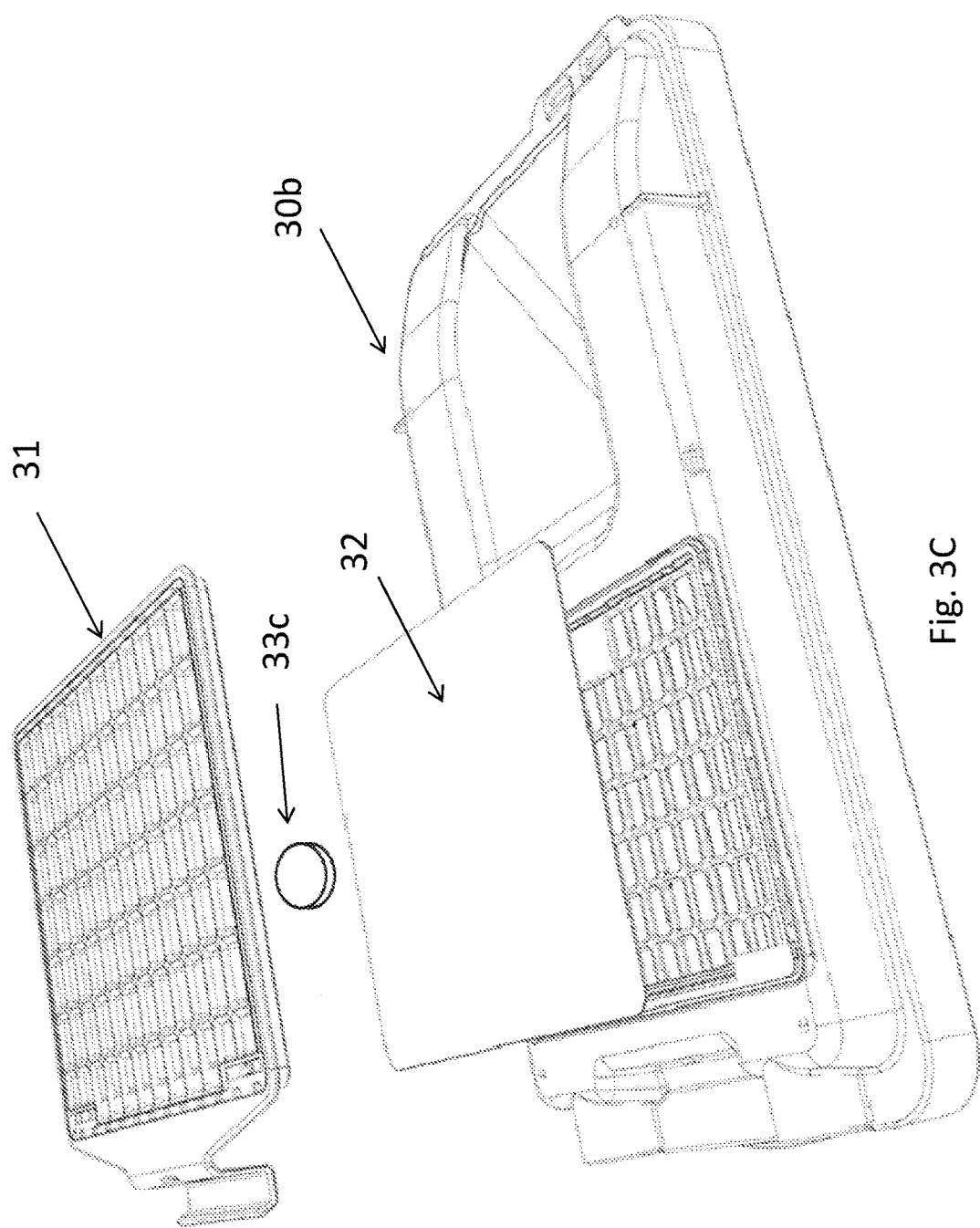

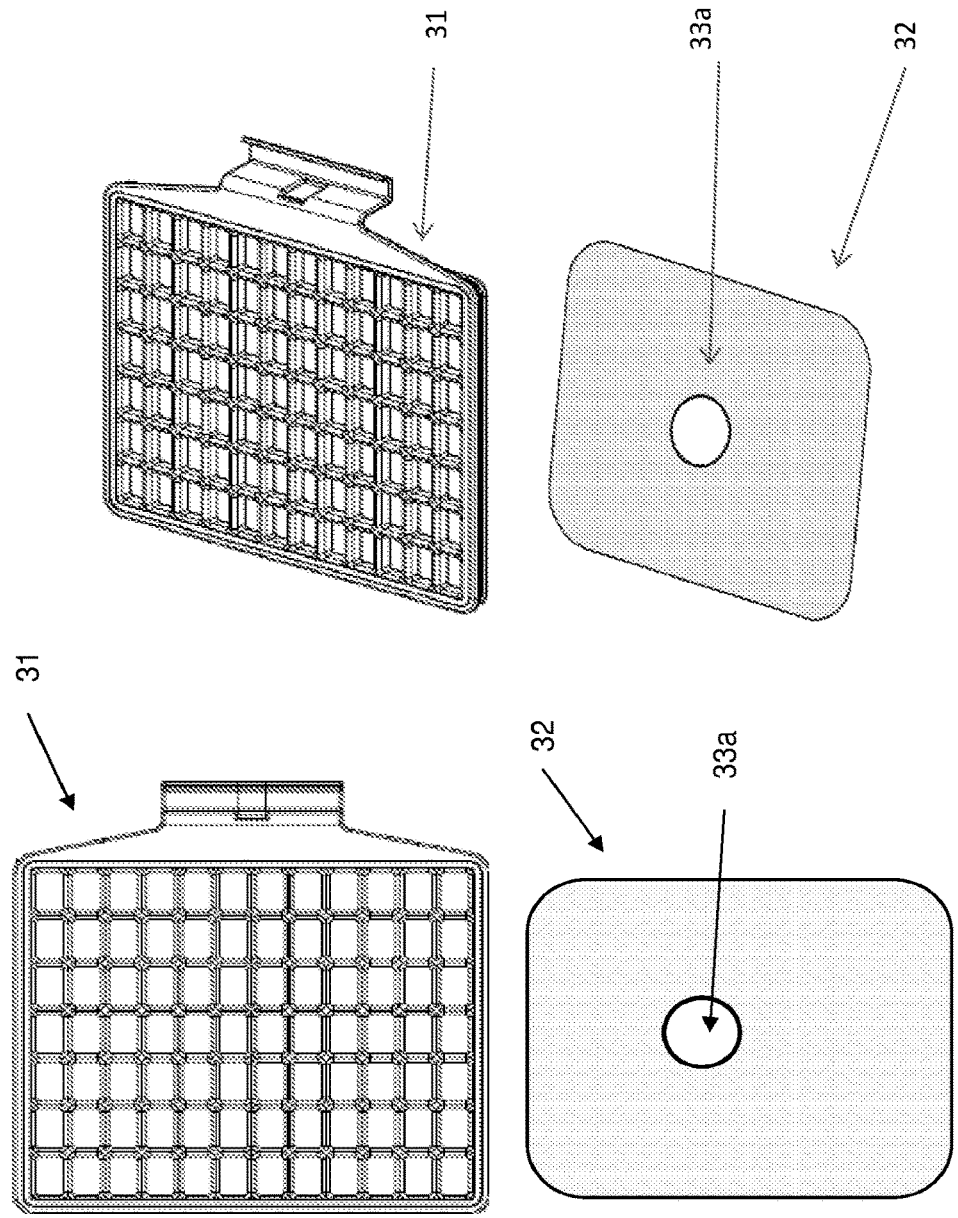

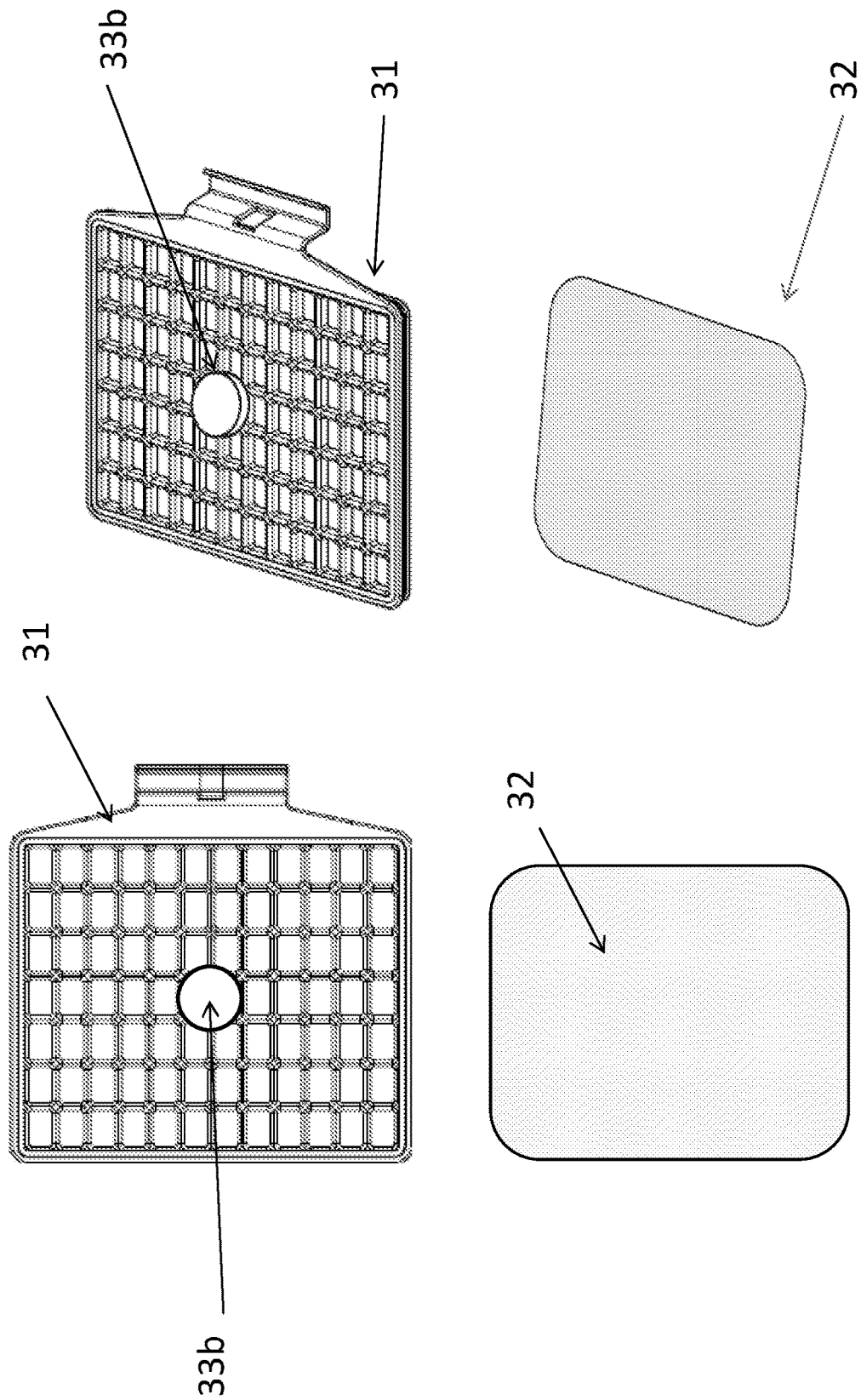

33a

SYSTEM AND METHOD FOR AUTOMATICALLY DETECTING THE PRESENCE OF CAGES IN THE SHELF OF A FACILITY

This application is a national stage application under 35 U.S.C. § 371 of PCT Application No. PCT/IB2014/058665, filed Jan. 30, 2014, which claims the priority benefit of Italian Application Nos. MI2013A000456, filed Mar. 26, 2013, and MI2013A000136, filed 31 Jan. 2013, each of which are hereby incorporated by reference in their entirety.

TECHNICAL FIELD OF THE INVENTION

The present invention relates to a system for the automatic detection of the presence of a cage or tray for containing laboratory animals inside a specific position of a facility shelf and a method for the management of data relating to the cage, implemented by means of said system, particularly advantageous for the laboratory technician.

BACKGROUND ART

The management of the all the cages inside a facility is one of the largest problems that the facility manager (in charge of the laboratory technicians who manage the facility) has to address on a daily basis.

Knowing exactly how many cages are in use, in total, in the facility, how many cages are associated to a given owner (researcher, work area), exactly where they are located, for how long they have been in that position and tracking any previous positions are just some of the issues that the facility manager must address and resolve.

In fact, the laboratory technician must periodically carry out, on the cages in a facility, operations of management/maintenance of the cages and/or operations on the animal population inside the cage linked to the scientific research being conducted by the researcher. With regard to the cage, as known, the technician may periodically be required to carry out a full cage change, in which the animals are moved from the "soiled" cage to a new clean cage inclusive of new basin and new cover, or a partial cage change, in which only the basin is changed, naturally including the clean bedding, but not the cover.

To give an indication, procedures commonly require the laboratory technician to carry out a partial cage change, in which the basin with the bedding is changed, every two weeks, while three times out of four the cover is generally reused on the new tray. The cover of the tray is only replaced during the fourth basin change.

Therefore, the technician must track the content of a tray, i.e. the animals housed in the tray, also when a full or partial cage change is carried out and therefore the population of the cage is moved. It is also necessary to keep track of the movements that are carried out on the cages so that the exact position of each tray is known at all times.

Another common problem relates to management of the free spaces on the shelves of the facility that can be used for the management of incoming cages. Currently, when it is necessary to prepare new cages with animals, the facility manager must send the operators to find out where there are sufficient spaces available to house these cages, to be created subsequently. This entails a waste of time and resources that an automatic inventory system totally resolves.

In fact, it should always be borne in mind that large research centers of universities, hospitals and/or pharmaceutical companies have facilities with thousands of trays, and therefore a visual check by the operator of the spaces available on the shelves is neither easy nor immediate.

A further problem addressed by this invention is correct "billing" of the use of cages to the respective owners (essentially the researchers). Facility managers currently use more or less automatic software systems that require manual entry of the start and of the end of use of the cage due to conclusion of the test. If the system is not updated manually, calculation of the number of days that the researcher's cage occupied the shelf is inaccurate.

Although there are systems capable of performing inventory currently available on the market, they still require human intervention or, more generally, all have limitations that prevent the system from being fully automatic. Known solutions on the market are, for example, those in which a census of cages is carried out based on detection via a handheld RFID reader of the card holders with an RFID tag incorporated therein.

With a system of this kind, it is possible to know the number of cages and their position only when this information has been acquired (when the operator effectively walks around the rooms and scans the cages) and therefore has some evident limitations, such as not knowing whether the cage being scanned has always been in that position or if it was place there a few minutes earlier by someone else. More generically, solutions of this kind do not allow the movements of cages to be tracked inside the facility.

A further problem currently affecting facilities concerns the removal of cages by unauthorized personnel. With the current systems described, it is not possible to monitor whether a cage is removed and, moreover, cages can be removed by anyone.

In substance, with systems of this kind it is not possible to carry out an inventory/census in real time, but only partial and on request.

Moreover, the majority of systems that currently propose an inventory of the facility associate a tag with RFID (radio frequency identification) data transfer system with the card holder provided on the tray.

In this case there are two possibilities:

The RFID tag is incorporated in/attached to the card holder.

The RFID tag is the tag (card) that is inserted into the card holder containing all the information relating to the animals present in this cage.

There are some structural problems: when the technician carries out a full cage change, he/she cannot merely move the card from one card holder (soiled cage) to another (clean cage) but must also physically move the card holder with the tag included from the soiled cage to the clean cage in order for the information on the electronic system to remain coherent (or alternatively must record the new clean card holder in the system and eliminate the previous one).

The use of paper cards containing an RFID tag is a costly solution, as a new updated card must be used each time the conditions of the cage change and this change must be indicated (i.e. animals added/removed).

Moreover, neither of these solutions solves a problem of uniqueness of the content of the cage.

If the RFID card holder (or the RFID card itself) is confused or mixed with other similar card holders, containing the same general information on the animals (type, number and species), it will be impossible to trace it back to the exact origin without taking action on the animals, for example by comparing the unique ID of the animals (for example on the ear tag of the animal) with the ID associated to the RFID card holder (or indicated on the RFID card).

Systems for inventory of the cages of a facility of the type discussed above are described, for example, in the prior art patent applications US 2012/0193415 A1 and WO 2012/051124.

Both these solutions essentially propose methods consisting of "tagging" the cage using RFID tags positioned directly on the cage.

Specifically, the solution proposed by US 2012/0193415 A1, fails to clearly describe a solution to the problem of how to incorporate the RFID label in the plastic tray, or of how to make it adhere permanently thereto. In fact, the tray is frequently autoclaved, so if this was a simple adhesive label, it would tend to be ineffective due to the numerous wash and autoclaving cycles to which the cage is subjected during its life. The fact of positioning the RFID label directly on the tray, on the basin or on the cover, has the drawback that at each cage change the data contained in the RFID label must be transferred to the new label incorporated in or attached to the tray. Moreover, this patent does not describe an automatic reading system of the RFID label, which is presumed to take place through a manual reading system, such as a handheld reader Instead, with regard to the patent WO2012/051124, as this refers to a disposable cage (which is therefore not washed and autoclaved as it is disposed of after around 10/14 days of use), the operator requires to carry out a time-consuming (and costly) operation each time to attach a new RFID adhesive label to the new cage to be used for the same animals being used in the experiment (every 10/14 days the cage must be replaced with a new one with clean bedding, the information on the cage must be transferred from the soiled cage to the clean cage, remaining coherent), and to transfer the data from the old label to the new one.

SUMMARY OF THE INVENTION

The object of the present invention is to provide a system for performing the inventory of a facility that is completely automated and can solve all the aforesaid problems that affect prior art systems, as well as offering further advantages.

The system according to a possible embodiment of the present invention comprises:
- a single RFID reader for each cage position arranged directly on the shelf;
- a push button preferably positioned on one of the two guides of the shelf of each cage position in which the cages are inserted;
- a visual indicator device, preferably an LED, positioned frontally preferably on said guide;
- a local electronic control unit (for example a Mini PC) for the management of all the sensors and devices of the shelf (RFID reader, LED and push button);
- a cage comprising an RFID tag applied to the upper face of the cover of the cage.

More precisely, the RFID tag can be applied in many ways, which are proposed herein:
- incorporated in an adhesive support and attached directly to the filter of the cage;
- incorporated in a plastic casing (plate) and removably coupled to the filter cover present on the cover of the cage, for example through snap fit coupling-release means;
- incorporated in a plastic casing (plate) that is inserted in a cavity suitably created in the filter cover.

The system further comprises central software that receives and exchanges data with the various local control units that manage the various shelves inside the facility.

In a possible second embodiment of the present invention, the function performed by the push button on the guides is replaced by a presence sensor.

According to this invention, there is described an electronic system that allows automatic tracking of the presence of each cage inside the facility, without the operator being required to perform further operations to add information to this system.

The flow of operations that can be processed with the system and the implementing method are as follows: through the central software the operator associates the new cage with the RFID tag to an owner, selectable from a list of available owners (created in advance on the central software during the initial set-up step). More in detail, although not forming the object of the present patent, but a prerequisite for fully understanding it, the operator reads the RFID tag with a specific reader which can be fixed (for example positioned underneath the changing station where the actual preparation of the new cage takes place) or movable (for example a handheld RFID reader). This specific reader is linked to the central software of the system and updates each time the data read and associated to the RFID tag in the database thereof.

The operator then prepares the cage with the number of animals required by the owner and positions it on a shelf in the position deemed most appropriate at that time.

The shelf of the system according to the present invention is provided with the same number of RFID readers as the number of cages that can be inserted. These RFID readers are positioned in each cage position to correspond with the filter of the underlying cage.

When the cage is inserted, the RFID reader is activated by the pushing of the push button on the guide of the cage inserted (or by the presence sensor connected to the RFID reader that "senses" the presence of the cage below and activates reading).

The use of a push button to activate the RFID reader also has the benefit of confirming correct insertion of the cage in its position. Vice versa, if the push button is not correctly pressed, the reader is not activated and the RFID tag is not read and associated to that position on the shelf and therefore in the facility, and the position remains erroneously available for other cages.

Operating in this way, the operator is not required to position the cage in a specific position on the shelf and better still is not required to enter any information relating to the positioning of the cage in the software of the system, which is automatically updated by the position of the cage selected by the shelf itself. In fact, it is the RFID reader itself that reads the RFID tag and communicates this to the local control unit (the Mini PC), which updates the central system with the new information.

With the system according to the present invention and the method implemented thereby it is possible to obtain numerous advantages.

For example, from the perspective of cage change, after 10/14 days of normal use, the operator takes the cage to be changed, the push button on the guide of the cage position on the shelf is opened and notifies the local control unit (Mini PC), which updates the central software, that a cage has been removed from that specific position of that specific shelf. Therefore, the central software places the cage in question in a sort of "limbo", in a "suspended" status, waiting for it to be returned to the same position or to another position of the shelf at the end of the procedure, or for it to be eliminated definitively from the system (the experiment is finished and the cage with the animals is no longer returned to the shelf).

In this way, the software is able to effectively track the various positions occupied by the cage for the whole of the duration of the experiment.

From a perspective of coherence and integrity of the data, during the full cage change, the operator positions the cage in the cage change station (these are laminar flow cage change stations known in the art) and reads the RFID tag of the cage using various possible techniques that do not form the subject of the present invention (using a handheld RFID reader connected via Wi-Fi to the central software of the system, or with RFID readers positioned below the work surface of the cage change station, and similar solutions.). Immediately after this, the operator also opens the clean cage into which the animals will be transferred; this has an RFID tag that has not yet been associated to any owner.

The central software first recognizes the soiled cage (as it is already present in its database) and then "reads" a cage not yet associated. It then asks the operator if the data associated to the soiled cage recorded must be transferred to the cage not yet associated. By accepting this action, the system will transfer all the information currently in its possession from the "soiled" cage directly to the "clean" cage. In this way, the coherence and integrity of the data and the traceability of the cage in the comprehensive system is guaranteed.

In the case of partial cage change, the situation is even simpler as the cover (with the RFID tag) is moved from the soiled cage to the clean cage, thus ensuring the integrity of the data without having to act on the central software.

A further advantage of the solution thus described is that, through the central software, it is possible to assign alarms relating to unauthorized removals to specific cages. In fact, as soon as one of the cages in question is removed, the push button of the corresponding guide is opened and the local control unit receives this information, updates the central software which can consequently draw attention to this alarm (for example by sending an email to the owner).

Further advantages of the present invention are represented by the suggested positionings of the RFID tag.

When the RFID tag is applied directly using adhesive to the filter of the cage the following further benefits are obtained:
  the system according to the present invention can be used on existing cages with a limited, practically non-existent, financial impact (only the cost of the RFID tag and of the adhesive in which it is incorporated, without requiring to replace anything), as it is only necessary to replace the filter of the existing cages with a filter provided with RFID tag according to the present invention or to apply the RFID tag to the existing filter
  instead of attaching the RFID tag directly to the cage, in this case greater protection of the RFID tag is obtained during washing and autoclaving, as it is protected by the plastic filter cover provided on each cage, thus ensuring unlimited seal;
  the current ergonomics of the movements required by the operator to open the cage can be maintained: in fact, with a natural movement for the operator, the cover is overturned through 180° to the right or to the left of the basin of the cage resting on the surface of the cage change station, so that the RFID tag can be read by an RFID reader positioned below the work surface of the change station. More in detail, this RFID reader can be positioned below the work surface in the case in which this is not made of metal and be connected to the central software for example through the use of a tablet PC suitable for rapid user interface.

Affixing the RFID tag using adhesive to the filter of the cage also offers two particularly important further benefits:
  the life of the filter of the cage is monitored and the end of its useful life can be notified, thereby helping the facility manager to manage the filters in the various cages better;
  it is possible to monitor and track the wash and autoclaving cycles of the cages carried out in the dirty zone of the facility. Each time the cover of the cage returns to the dirty zone, its RFID tag (unique by definition) is read by a further specific reader connected to the central software, which can therefore provide a report on how the cages are managed in their constant rotation during use. In this way, the facility manager can learn whether some cages are used more than others, which remain inside the clean zone for longer as they are not used.

In the case of the second technical solution suggested in this invention, i.e. when the RFID tag is incorporated in a plate that has snap fit type couplings to fix it to the filter cover grid, the following further benefits are obtained:
  immediate retrofitting of the cages already present on the market, as the plate becomes an accessory to be added to and removed from the cage;
  perfect resistance to washing and autoclaving determined by the fact that the plate is watertight and also acts as heat protection for the RFID tag;
  possibility of immediate replacement in the case of a fault, as the couplings used allow coupling/release;
  immediate visual confirmation of the presence of the plate on the cover of the cage by the operator.

Moreover, if the user wishes to maintain this plate always coupled to the cover of the cage, the same advantage as described in the previous solution is obtained, i.e. of being able to monitor and track the wash and autoclaving cycles of the cages carried out in the dirty zone of the facility.

Finally, the third solution proposed by this invention is a compromise between the two previous solutions. By inserting the plate with the RFID tag incorporated inside it directly into a cavity suitably created in the filter cover, in order to form a permanent system for housing the RFID tag, this offers the evident advantage of allowing simple application and replacement of the plate merely by opening the filter cover when coupled to the cage, maintaining all the previously indicated advantages.

From a functional perspective, the RFID tag applied to the filter of the cage, the RFID tag incorporated in the plate and each RFID reader on the shelf must ensure resistance to and functionality to washing and autoclaving in order to avoid introducing specific management procedures of the shelves or of the cages.

With regard to the RFID tag, the market already offers examples of water-repellent RFID tags resistant to high temperatures incorporated in adhesive materials that can be used for this purpose.

For the solution with RFID tag incorporated in the plastic casing, modern molding techniques make it possible to produce the plate required to house the RFID tag with total thicknesses in the order of a few millimeters, so that they have limited dimensions and are easy to manage.

Instead, with regard to the RFID reader, the solution that can be used in this case consists, for example, of the use of epoxy resins that protect the electrical circuits from damp and are transparent to RF.

BRIEF DESCRIPTION OF FIGURES

Further characteristics and advantages of the present invention will be apparent from the following detailed description of some preferred embodiments of the present invention, which are purely illustrative and non-limiting, and are illustrated with reference to the accompanying figures, wherein.

FIG. 1C shows, again in perspective front view, three cages placed one over another in the same number of cage positions of the system according to the present invention; each RFID reader reads the tag of the underlying cage;

FIG. 3B instead shows an exploded view of the cover of a cage with the RFID tag incorporated in the plate with couplings for the filter cover grid;

FIG. 3C instead shows an exploded view of the cover of a cage with the RFID tag incorporated in the plate to be inserted in the cavity created under the filter cover grid;

FIGS. 4A and 4B respectively show a top view and a perspective view of a filter cover and of a filter provided with RFID tag to be inserted in the cover of a cage according to a possible mode of the present invention;

FIGS. 4C and 4D respectively show a top view and a perspective view of the RFID tag incorporated in the casing already coupled to the filter cover;

DESCRIPTION OF THE INVENTION

Figure 1A:
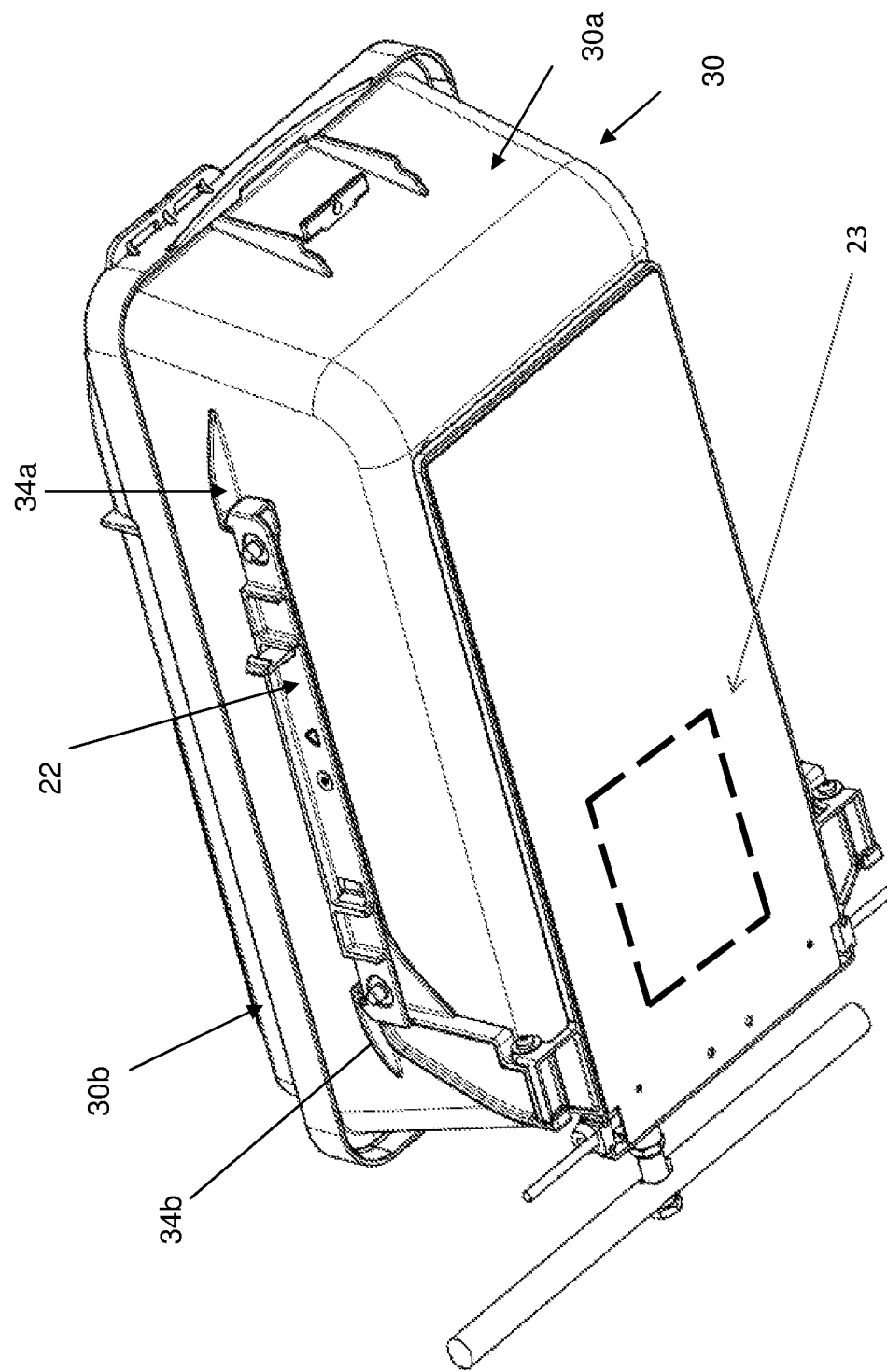
FIG. 1A shows a perspective bottom view of a detail of the system according to the present invention showing a cage position provided with RFID reader arranged on the shelf, in particular below a cage in order to read the RFID tag of an underlying cage.

According to a first embodiment of the system 1 according to the present invention, it comprises a shelf 20 defining a plurality of seats or cage positions 21 each of said cage positions comprising a pair of guides 22, substantially horizontal and parallel to each other, designed each to support one side of a cage 30 when this is inserted into the cage position 21.

Each of said seats or cage positions 21 also comprises an RFID sensor 23 capable of reading an RFID tag 33 positioned on a cage 30.

More in particular, the RFID reader 23 mounted on the shelf is positioned in the lower area of each cage position 21 so that it is arranged below a cage 30 and is located in the area of the filter 32 of the underlying cage 30 in order to read the adhesive RFID tag 33 a applied to the filter 32 of the underlying cage.

Each cage 30 comprises a basin 30a and a cover 30b. According to the prior art, the cages 30 in question also comprise, inserted in a specific seat created in the cover 30b, a filtering element 32 composed of a thin sheet of porous material suitable for the purpose, according to the prior art. This filtering element 32 is retained in its seat created inside the cover 30b by a filter cover 31. In order to allow air to flow from the outside and the filtering action of the filter 32, both the portion of cover under the filter 32 and the filter cover 31 are created as grids capable of allowing air to flow through and at the same time of retaining in position and protecting the filtering element 32.

In accordance with the system, according to a possible embodiment of the present invention, an adhesive RFID tag 33 a is applied directly to the filter 32, on which information relating to the tray can be recorded, such as the "owner", i.e. the name of the researcher conducting the experiment on the animals housed in the tray, and its content, i.e. data relating to the animal population contained in the cage, such as number, gender and other data relating to the animals contained therein.

A possible alternative embodiment of the present invention includes the use of an RFID tag incorporated in a plastic casing, (for example a plate) 33b provided with coupling/release means (snap fit) 61 to/from the filter cover grid.

A further alternative embodiment of the present invention includes the use of an RFID tag incorporated in a plate 33c which is inserted in a specific cavity 62 created in the filter cover grid 31.

Preferably, the system for the inventory of the cages of a facility also comprises means for detecting correct positioning of a cage inside a cage position 21.

Figure 1B:
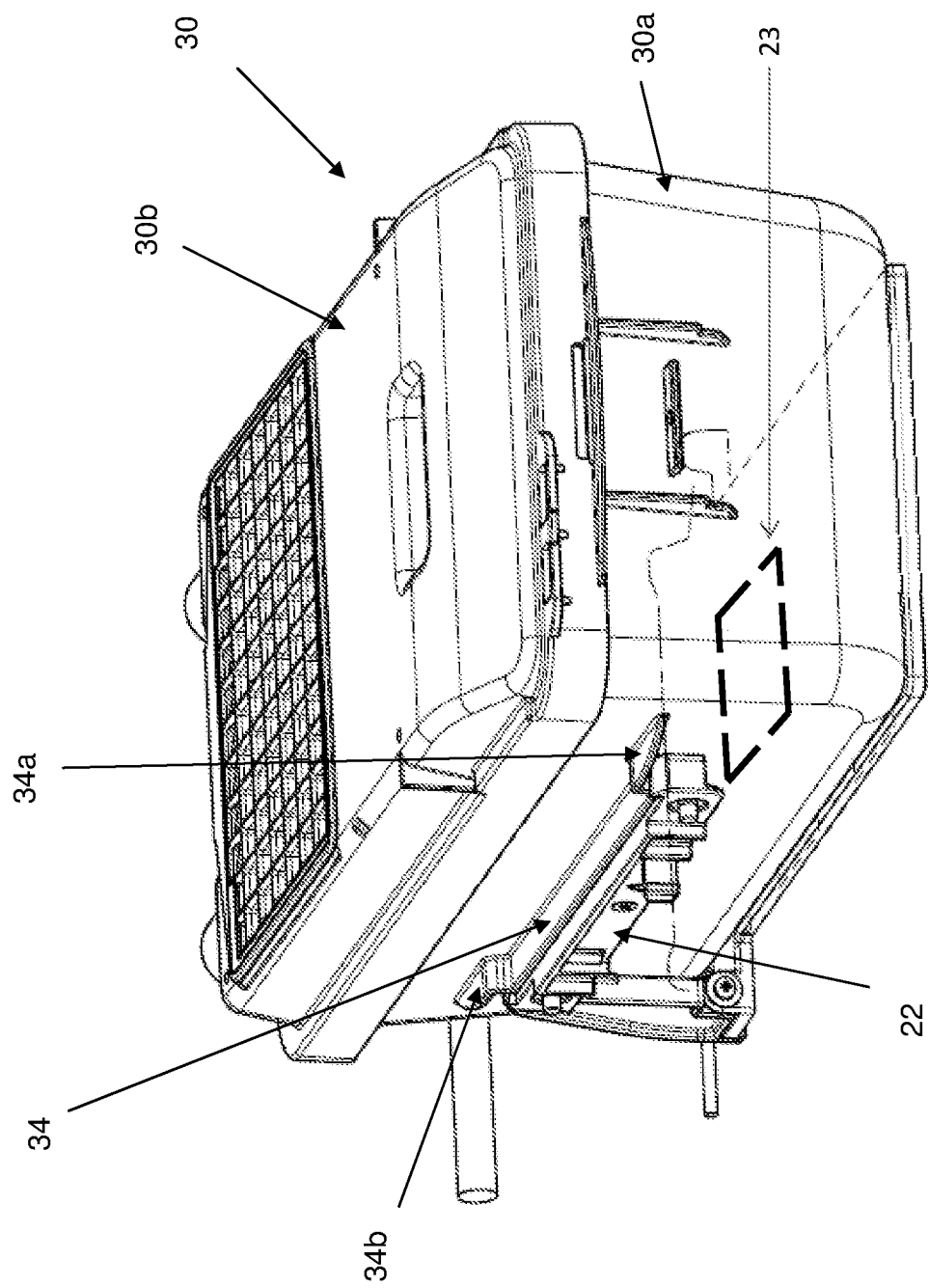
FIG. 1B shows a perspective front view of the same view as FIG. 1A, in which the positioning of the RFID sensor on the shelf can once again be seen.

According to a possible embodiment of the system according to the present invention, said means for detecting correct positioning of the cage comprise a switch 24 arranged on at least one of said guides 22 for supporting the cages of a cage position, which is structured in order to be pressed only when the cage is correctly inserted in the cage position of the shelf. With particular reference to FIG. 1B, it can in fact be noted that the cages according to the present invention are of the type comprising lateral "tabs" 34 structured in order to be inserted stably on the guides 22. In particular, according to the known structure of the trays 30 and of the guides 22 developed by the same applicant, said guides 22 have a projection or a tooth 22a in the front area and another 22b in the rear area, and the lateral tabs 34 of each tray are structured in order to have a central portion designed to rest on the central portion of the guides 22, and front 34a and rear 34b portions that are connected to said central portion 34 of the tab in order to abut against said teeth 22a, 22b of said guides 22 when the tray is correctly positioned on the guides.

Thanks to the front 22a and rear 22b stops between guide 22 and tab 34, the cage that is correctly inserted in the related guides will have the tabs 34 that rest, in the central part thereof, against the guides 22, while the front 22a and rear 22b teeth prevent movement of the tray in the direction of extraction/insertion of the cage from/in shelf, and in order to be extracted from the cage position, the tray must be raised slightly by the operator to enable the tabs 34 to move beyond the front tooth or raised part 22a provided on the guides 22.

Figure 2:
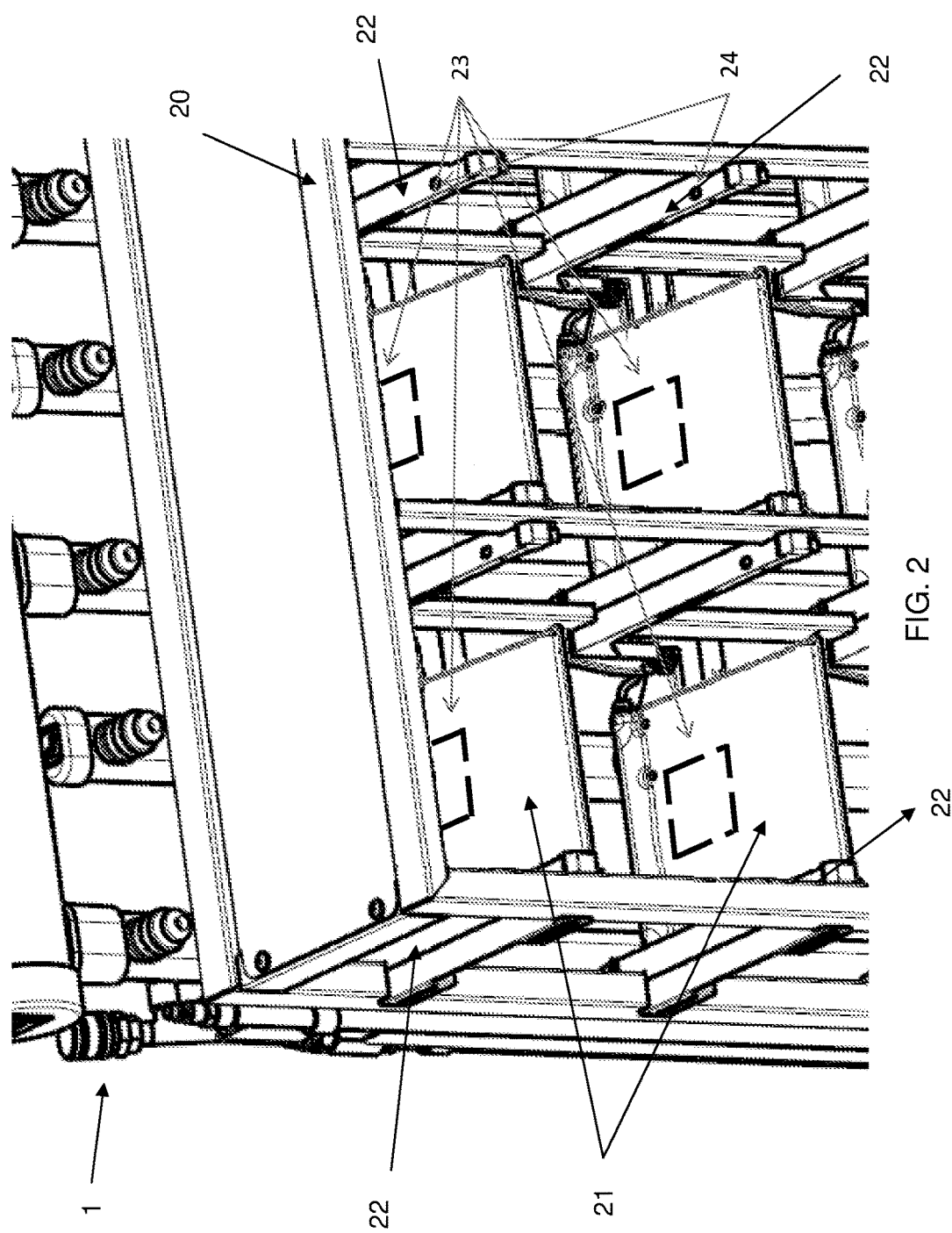
FIG. 2 shows, in a perspective top view, a detail of the system according to the present invention showing in particular some cage positions of the shelf provided with RFID sensors for reading the RFID tag of the underlying cages and the guides of said cage positions, for insertion of the trays with push button or switch for operating the RFID reading sensor inserted in the guides, which is pressed when a tray is positioned correctly in its seat.
Figure 2A:
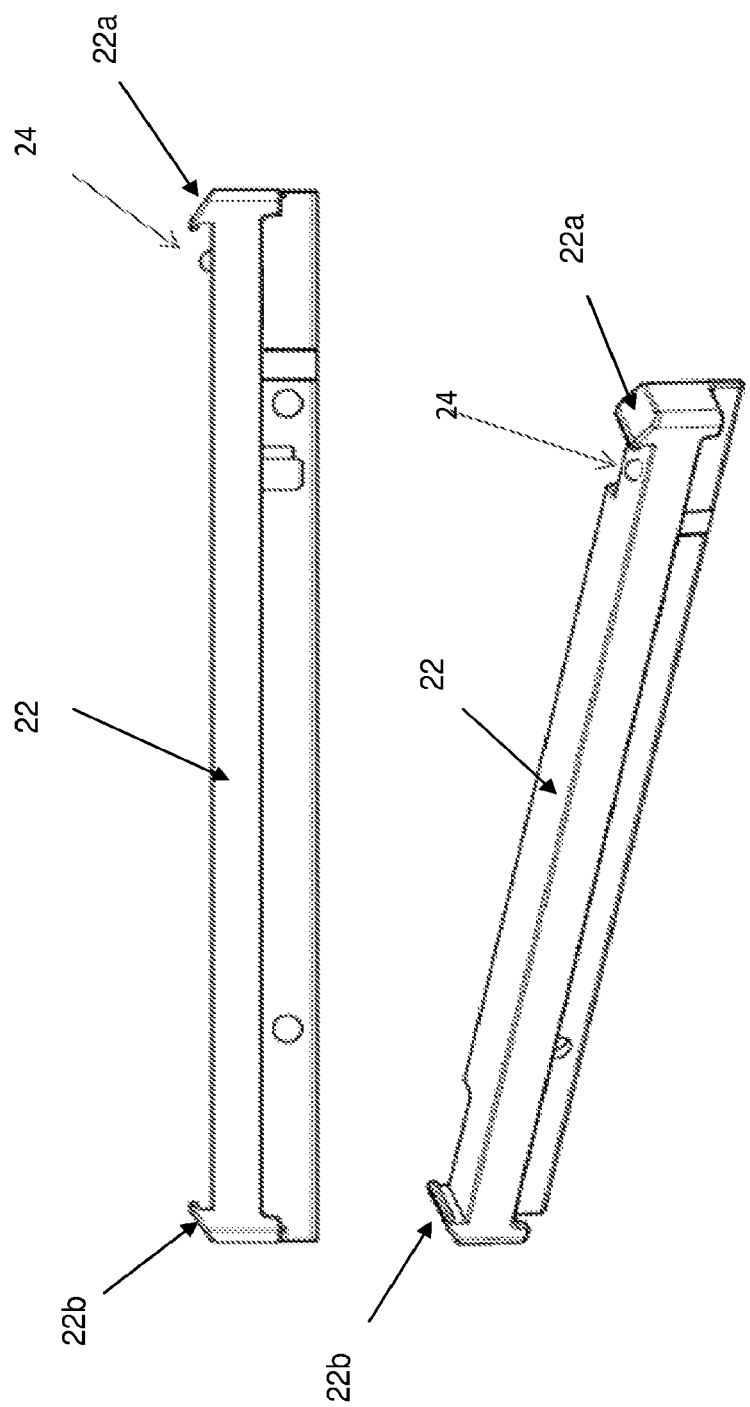
FIGS. 2A and 2B show a detail of the positioning guides of the trays, in particular these figures schematically show respectively the presence of the switch for correct positioning of the cage and the positioning, besides this switch, of a visual indicator, preferably an LED, arranged in the front area of the guide.
Figure 2B:
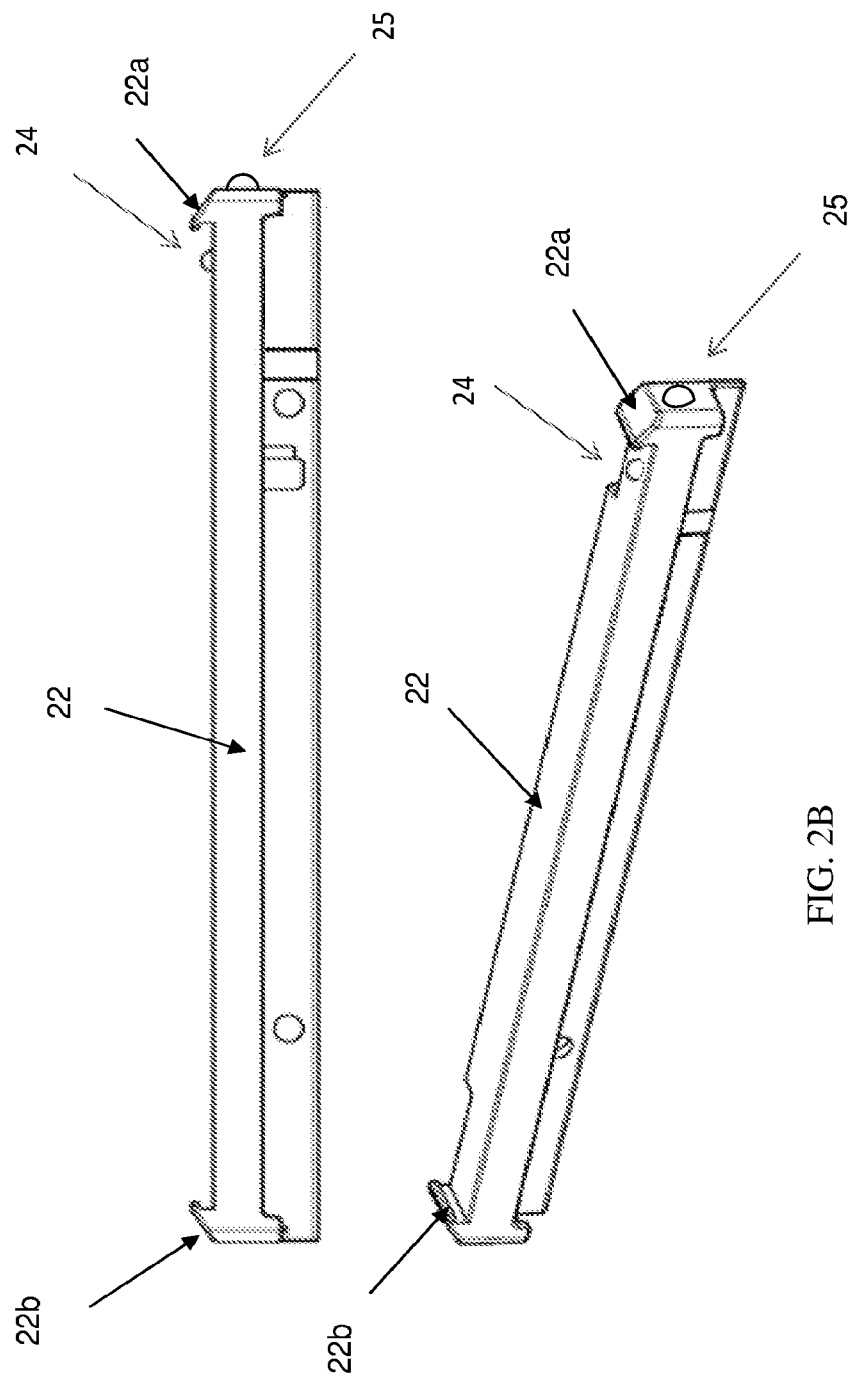
Figure 2C:
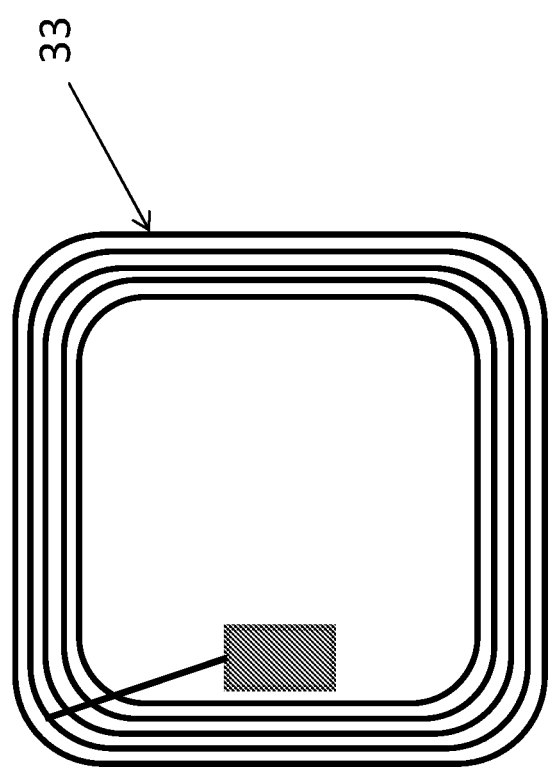
FIG. 2C shows a generic RFID tag.
Figure 3A:
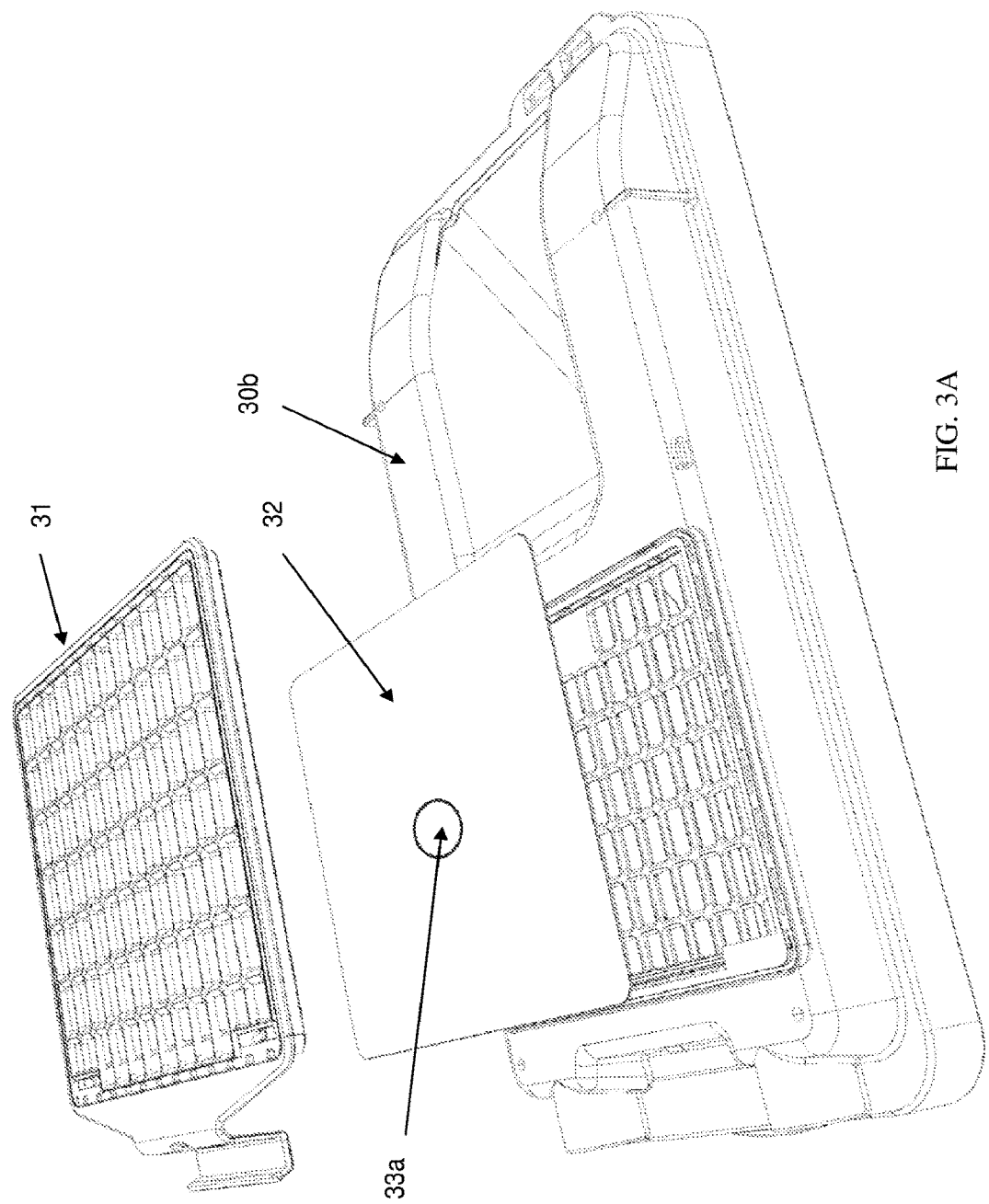
FIG. 3A shows an exploded view of the cover of a cage comprising a filter provided with RFID tag.
Figure 4E:
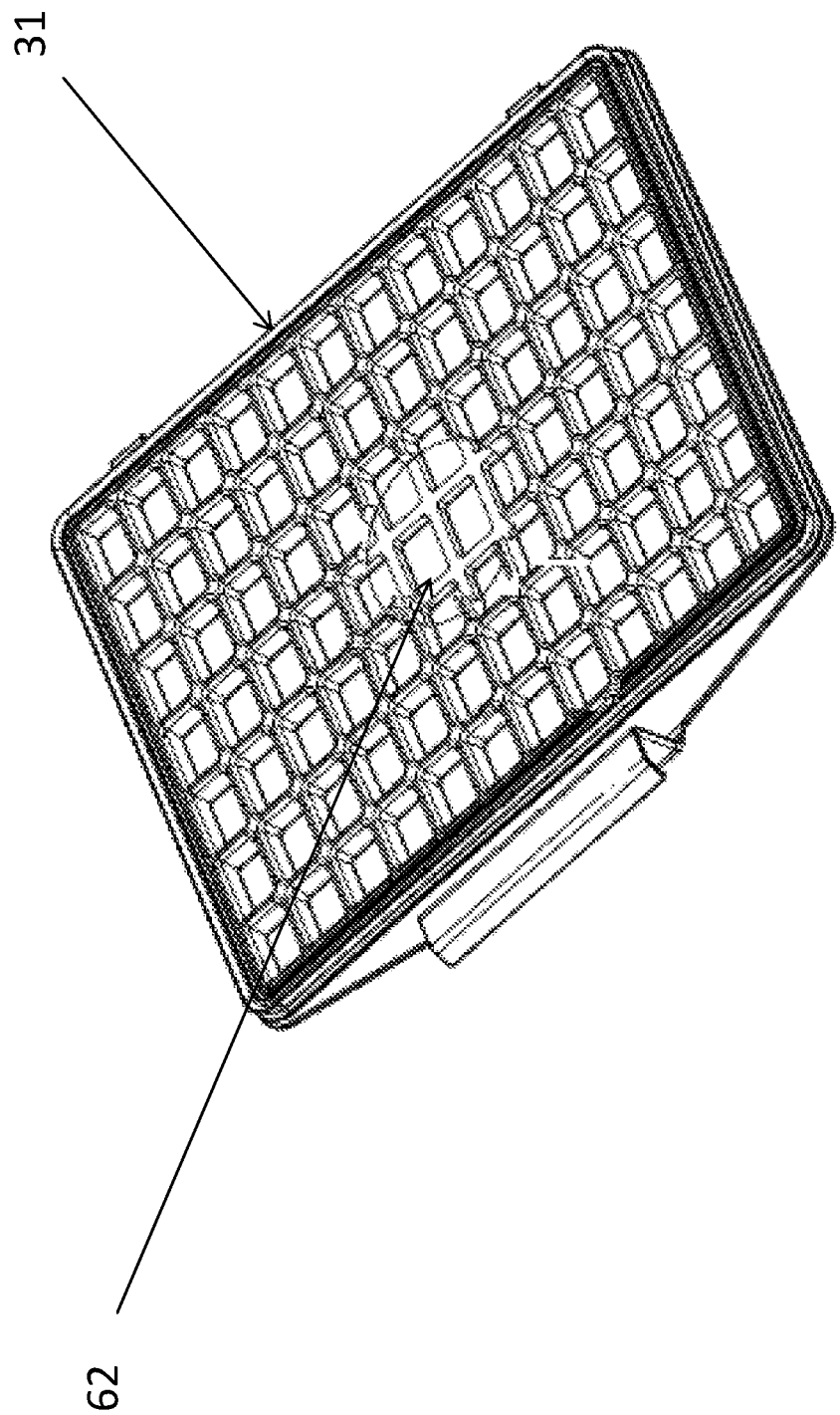
FIG. 4E instead shows a perspective view of the cavity created in the filter cover for housing of the plate with RFID tag incorporated.
Figures 5A, 5B:
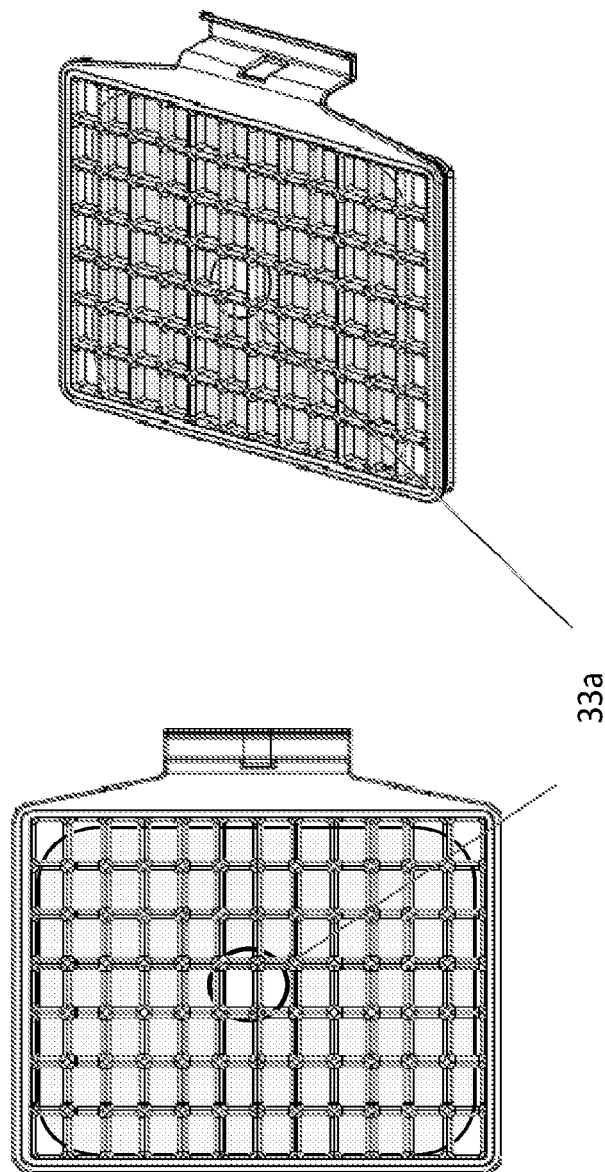
FIGS. 5A and 5B respectively show a top view and a perspective view of a filter cover comprising a filter provided with RFID tag according to a possible embodiment of the present invention.
Figure 5D:
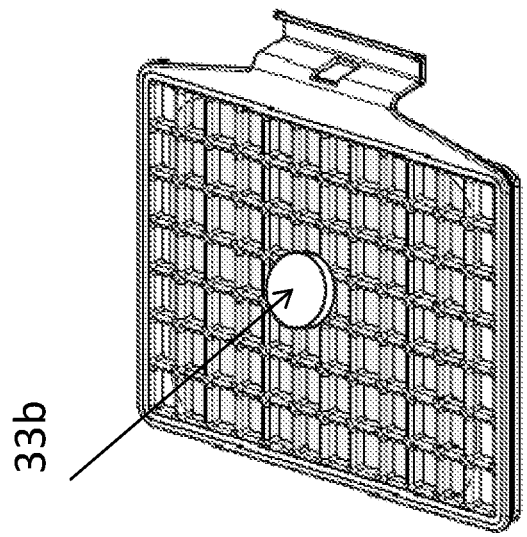
FIGS. 5C and 5D respectively show a top view and a perspective view of the RFID tag system incorporated in the plate, coupled to the filter cover according to a further possible embodiment of the present invention.
Figure 5C:
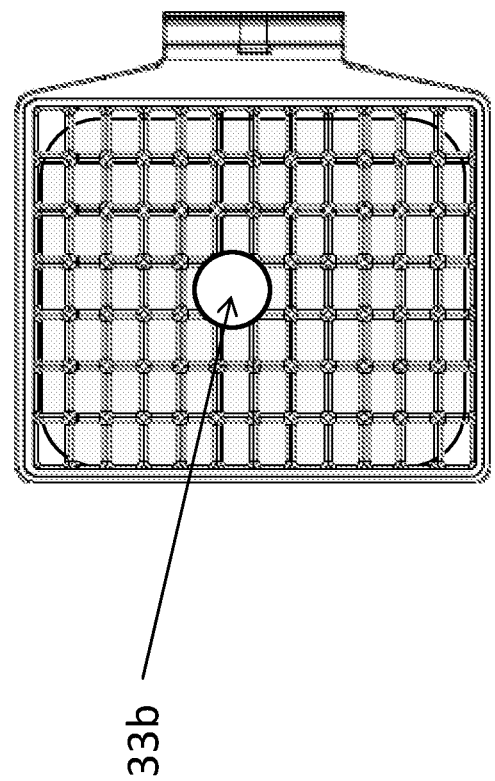
Figure 6A:
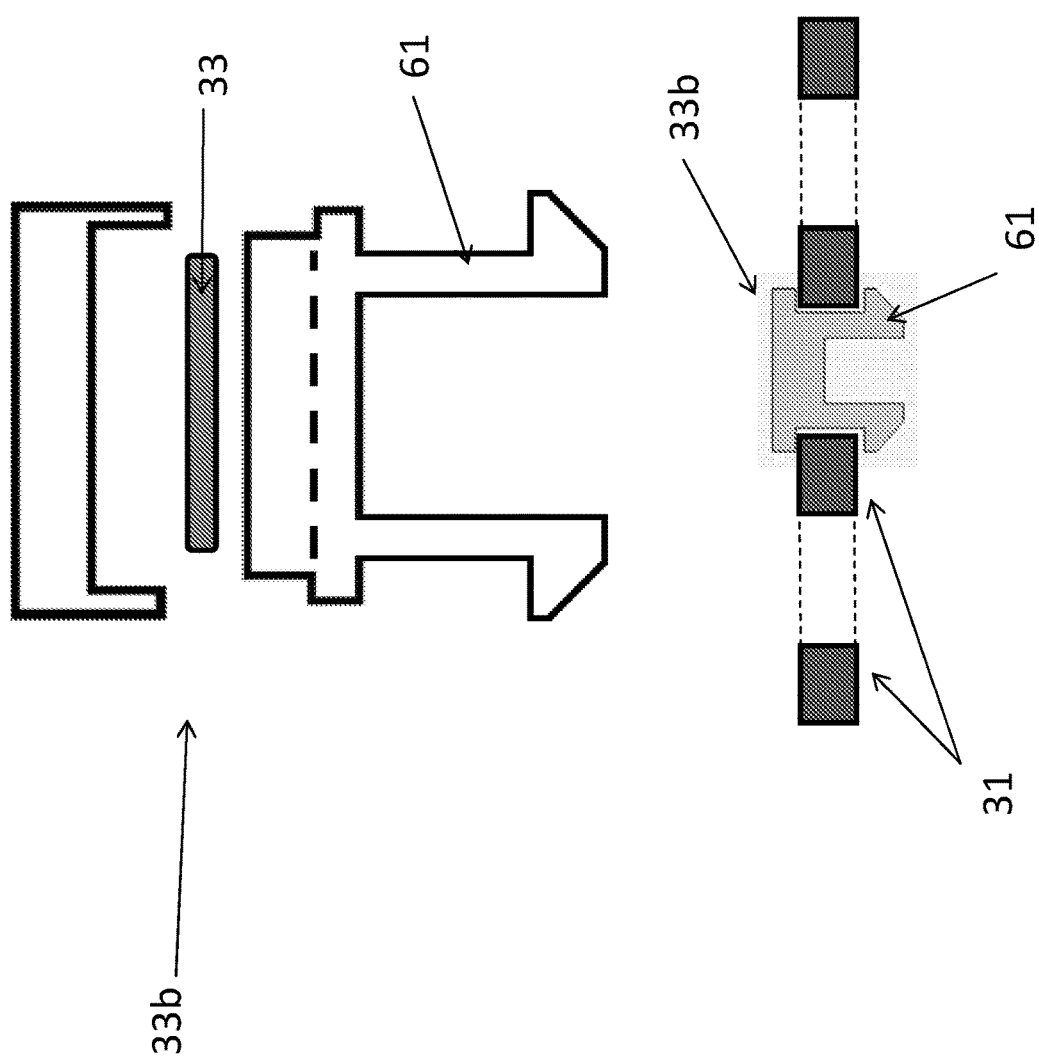
FIG. 6A shows two exploded side views of the plate with coupling system (snap fit) and mode of coupling to the grid.
Figure 6B:
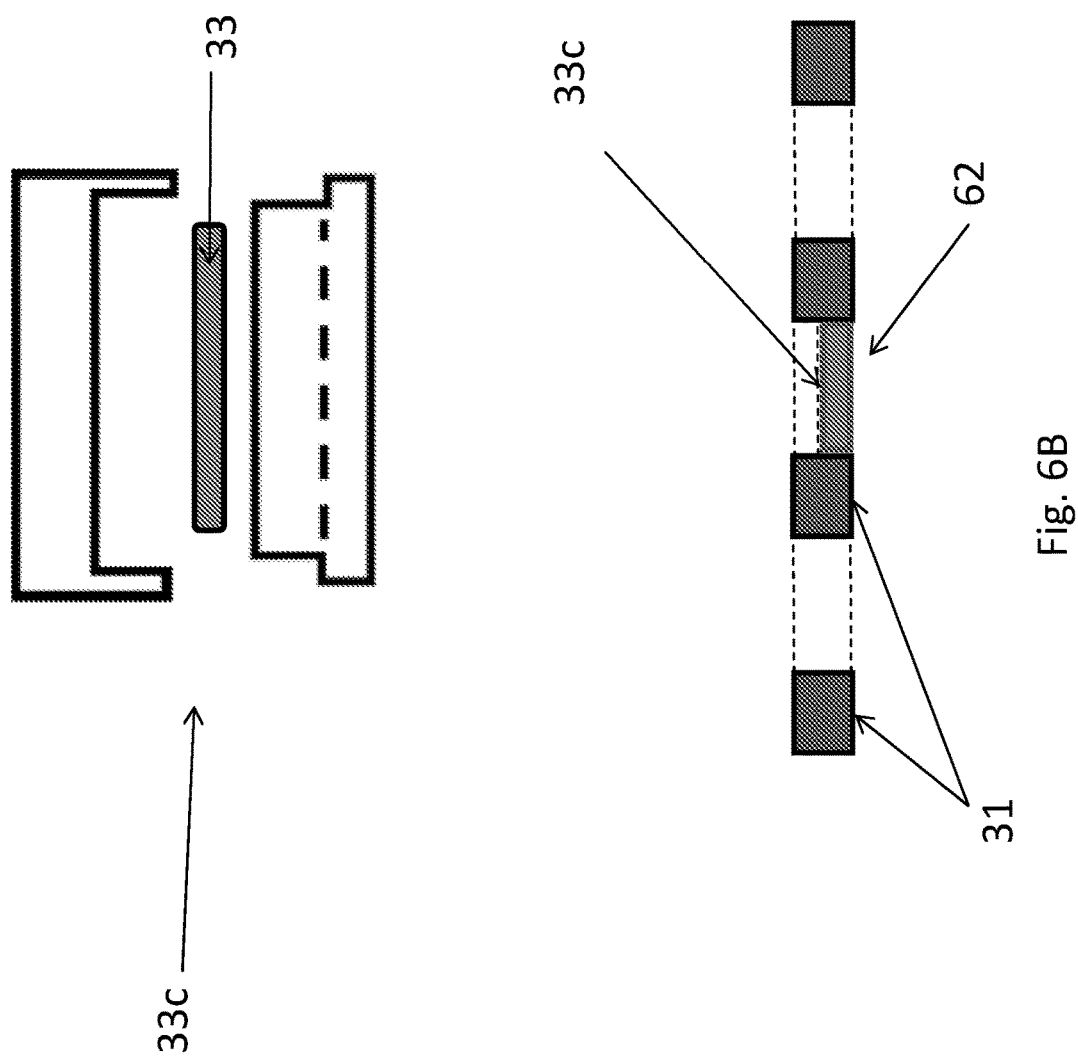
FIG. 6B shows two side views of a plate designed to be inserted in a cavity specifically created in the filter cover grid.
Figure 7:
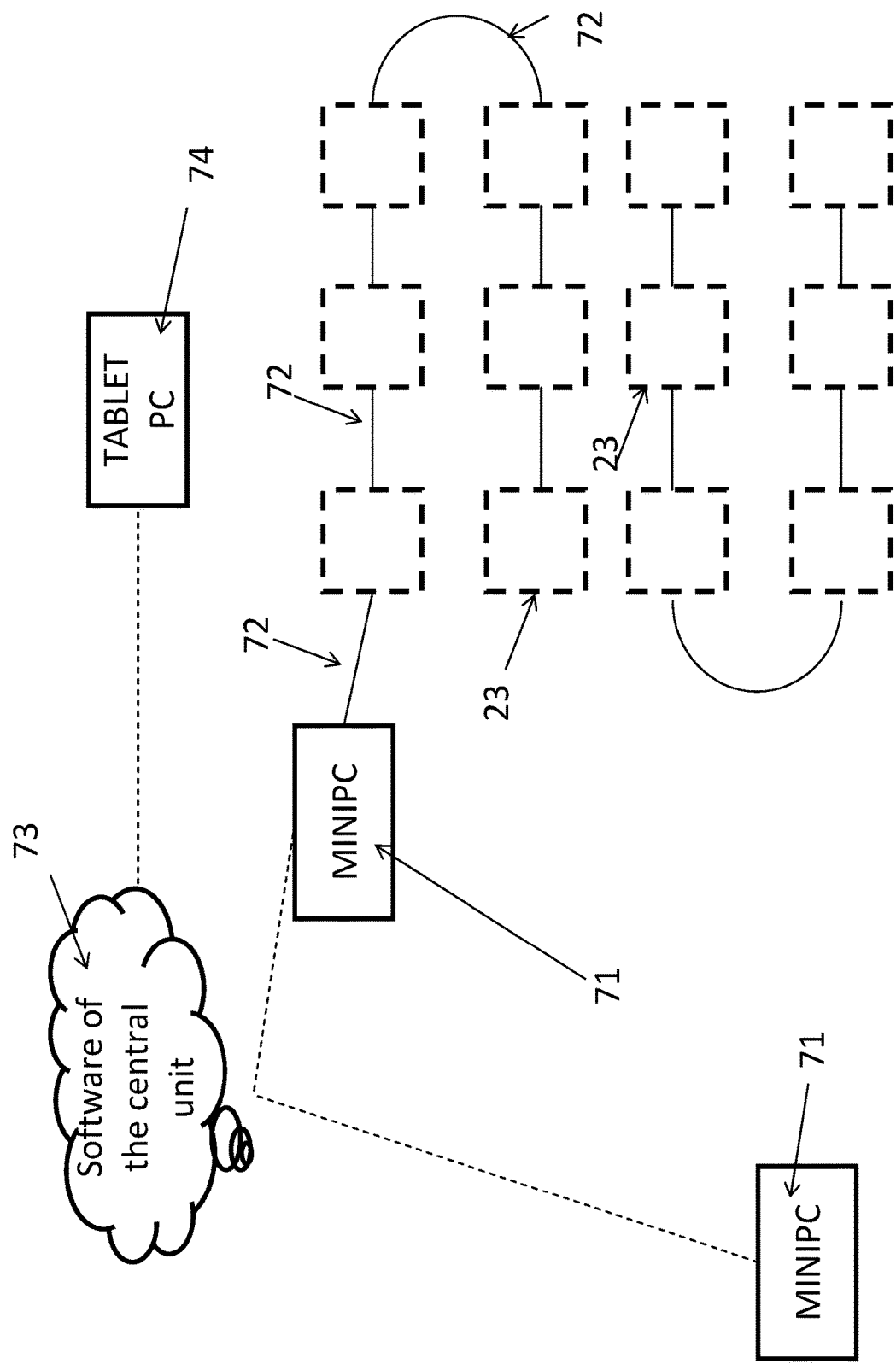
FIG. 7 shows a possible embodiment of architecture for the transfer of data from the RFID readers to the local control unit (Mini PC) and to the central software.

By exploiting this structure of the guides 22 and of the tabs 34, the system according to the present invention provides for positioning of the switch 24 immediately against the front tooth 22a on the side of the central part of the guide 22, as shown, for example, in FIG. 2A. In this way, the switch 24 will be pressed only when the cage is correctly positioned on the guides.

As soon as the switch 24 is pressed by insertion of the cage, the Mini PC 71 of the local control unit of the system according to the present invention receives the information and automatically activates the RFID reader 23 above, which reads the RFID tag 33 of the underlying cage inserted. The information read is the ID (the identification code of the cage) of the RFID tag 33.

At this point, this ID is transferred, through the Mini PC 71 of the local control unit, to the central software 73, which checks for its presence in the comprehensive database of all the cages already recorded. If it is effectively already present in the database, this means that the cage has been correctly recorded in the system before being inserted in the shelf.

The central software 73 therefore sends confirmation to the Mini PC 71 that the cage is correctly present in its database.

At this point, the Mini PC 71 controls the visual device 25, preferably an LED, arranged frontally at least on one guide 22 of the cage position 21 in which the cage has just been inserted, which lights up with a green light for a few seconds to give the operator visual confirmation that the insertion procedure has been carried out correctly.

Instead, if this ID is not found in the database, the LED 25 will flash with a different color, for example blue, for a few seconds to indicate that a cage not recorded in the database has been inserted (a new cage not yet associated to an owner).

If the cage is not positioned correctly in the guides this instead will cause a different situation. As the switch has not been closed, no LED will light up.

Purely by way of explanation of the comprehensive system, connection of the Mini PC to the various RFID readers 23 present on the shelf, which does not form the subject of the present invention, can be developed in series, with the Mini PC 71 that is connected to the first RFID reader 23, which is then in turn connected to the second RFID reader 23, and so forth. The communication channel can, for example, be a serial bus 72 on which all the RFID readers 23 and the Mini PC 71 interface.

In a preferred embodiment, the system according to the present invention can also comprise, at each cage position 21, a capacitive sensor according to the description provided in the patent application PCT/EP2012/069196 by the same Applicant.

Through the capacitive sensor arranged below the cage, the system detects the presence of the cage but does not receive the signal that the push button has been correctly pressed, which means that the tray has not be correctly positioned. This situation causes the LED 25 to flash red for an extended period of time.

Another situation that could occur is that a cage has been inserted correctly, but has no RFID tag 33 of reference, or has a faulty tag. In this case, the RFID reader is correctly activated by pushing of the push button 24 but it cannot read any RFID tag. The LED 25 will emit a different visual signal, for example a fixed (not flashing) blue light for a predetermined period of time.

In a further embodiment of the system according to the present invention, the RFID reader 23 can make use of a proximity sensor in place of the capacitive sensor described in PCT/EP2012/069196, which can detect the presence of the underlying cage and activate the RFID reader to read the RFID tag 33.

In this case, correct insertion of the cage is ensured by the fact that the RFID reader 23 can effectively read the RFID tag 33 of the underlying cage, as this latter is in the reading range of the RFID reader 23. If the RFID tag read is already in the database of the software of the system, the LED 25, again arranged frontally on the guide of the shelf in which the cage is inserted, lights up with a green light for a predetermined time, to confirm that the procedure to insert a new cage in the shelf is correct.

Instead, if the cage is not correctly inserted, the RFID reader 23 is activated by the presence sensor (as the cage is inserted) but it cannot read the RFID tag 33 of the underlying cage as this latter is not within its range of action. In order to indicate this event, the LED 25 arranged frontally on the guide corresponding to the cage position in which the tray is inserted flashes with a red light for a predetermined time.

The same situation occurs if the cage is correctly inserted but the RFID tag 33 that it supports is faulty or missing. The RFID reader 23 can read the RFID tag as it is within its reading range, but it does not reply (missing or faulty). The LED will flash with a red light for a predetermined time.

Finally, if the cage is correctly inserted but the RFID reader reads an RFID tag not present in the database, the LED flashes with a blue light for a predetermined time.

As can be seen, with the system according to the present invention it is possible to provide the operator with immediate visual notification of any fault in the positioning of the cage, in the case of incorrect insertion of the cage in the seat, in the case in which the cage has been correctly inserted but the right ID has not been correctly associated to the RFID tag supported thereby, and also in the case in which the tag is faulty. The system according to the present invention can also use different means to detect the cage presence, as said: a simple presence sensor or capacitive sensor, in this case also capable of detecting the condition of the bedding.

In a further embodiment of the system according to the present invention, in the case in which the presence of LEDs that light up might be considered a source of disturbance for the animals housed in the surrounding shelves, the software of the central system 73 can advantageously reproduce the graphic representation of the shelf required directly on a device connected to the central software 73, for example a tablet PC 74 or analogous portable device.

The inventory system according to the present invention can also be advantageously provided with further control functions to complete the tracking of the movements of a cage during the experiment within the facility. These do not form the object of protection of this patent, but are described herein to better explain the advantage of applying the invention described herein. For example, the cage change station, or more generically the station in which the cage with the animals is prepared for the first time, must be provided with at least one specific RFID reader to read the new RFID tag 33 of the cage being prepared, a portable (tablet PC) or fixed (desktop PC) hardware device 74 containing a local software that interacts with the database of the central software 73 and connected to the RFID reader (wired or wireless), which receives the unique ID generated by reading the RFID tag 33 and compares it in real time with the log contained in the database of the central software 73. If this ID is missing, for the system this can only mean that this cage must be associated to an owner. Therefore, on the graphic interface of this local software, the user can choose an owner (usually the researcher) to associate this ID with and consequently to associate the cage being prepared with.

This fundamental step in the workflow thus enables the central software 73 to update its database, with association of the unique ID of the RFID tag 33 read with an owner at a given date and time.

When the operator inserts the new cage in any shelf connected to the local control unit (Mini PC 71) and therefore to the central software 73, this information packet (ID, owner, date and time) is also completed with the precise position of this cage in the facility.

Instead, in the case of the more common cage change procedure, the operator carries a cage already present in the database to the change station and opens it, reading it with a specific RFID reader, fixed or portable, arranged in proximity to the cage change station (not forming the subject of this patent).

At this point, if a full cage change is being carried out (i.e. the clean cage is complete with all its components), he/she must open a second (clean) cage, reading the TAG RFID tag 33 with another specific RFID reader present below the change cabin. At this point, the local software installed in the Tablet PC 74, connected to the various specific RFID readers of the change station and to the database of the central software 73, interprets this operation as a full cage change and proposes transferring all the information associated to the current RFID tag 33 of the soiled cage to the RFID tag 33 of the new clean cage. This step is fundamental to maintain the traceability of the content of the cage in the experiment.

Instead, if the change being carried out is partial (i.e. the cover 30*b* is re-used on the clean cage, which therefore has no cover), there is no need to use the local software interface as the clean cage continues to use the RFID tag 33 already present in the database. However, in the case in which it is necessary also to electronically track this partial cage change carried out, the operator must read the RFID tag 33 with the RFID reader available under the change station and then manually select this activity on the local software which, correctly programmed, will offer this option.

If the system according to the present invention is used with the capacitive sensor described in the patent application PCT/EP2012/069196 by the same Applicant, in the case of a partial cage change no manual selection of the procedure carried out on the local software at the change station is necessary, as the capacitive sensor reads the different bedding values associated to the RFID tag 33 of the cage before and after the cage change operation. In this way, the partial cage change tracking process is totally independent from any interaction procedure with local software by the operator.

Moreover, in a further possible variant of the system according to the present invention, as well as indication of the owner, it is possible to provide the central software 73 with further information relating to the content of the cage, such as:
  number of animals
  gender of the animals
  species of the animals
  experiment protocol used.

In this way, the report proposed by the central software 73 includes more information to be presented (it may also include the number of animals managed by the researcher, according to facility, in the period of time selected, etc.).

In a further possible variant of embodiment of the system according to the present invention, knowing where specific cages and/or specific animals are located enables the owner (generally the researcher) to allocate specific tasks/duties to be carried out by an operator on the cages within a given period of time. Using this system, the operator receives clear tasks to carry out (cage task list) and above all receives the exact position of the cages to be managed.

More in detail, the person in charge of the cage makes use of a multiple or single allocation of a given task to all his/her cages or to one in particular through a local software that interfaces with the database of the central software 73.

The central software 73 then summarizes the list of operations/tasks to be carried out by the operator with the exact location of the cages in question (cage task list).

In a possible embodiment, the operator logs in at the shelf using his/her ID badge on the local control unit of the system (the Mini PC 71 provided with a badge reader). This information is transferred to the central software 73, which activates the visual device 25 (LED) of the shelf and switches on the green LED of the cages to be collected to carry out the tasks required. This further facilitates collection of the right cages on which to carry out the operations.

At this point, the operator opens the cage in the change station and reads the RFID tag 33 with the RFID reader connected to the local hardware (preferably tablet PC) 74 present under the change station where local software is installed.

This dialogs with the database of the central software 73 and receives from this latter information relating to the task to be carried out for this given RFID tag 33. As there is a task to carry out on this cage, the local software visualizes this, indicating what must be done and then waits for confirmation that the operation has been carried out. As soon as the operator confirms that the task has been performed, the operation is traced electronically on the central software 73 and the database is updated with respect to this cage with date, time and the operator who performed it. Therefore, this comprehensive system allows the tracking and subsequent confirmation of all the operations/tasks to be carried out.

A further problem solved by a comprehensive system of this kind is that of protecting a cage from unauthorized removal. At the level of central software 73, a given cage can be declared non-removable from the shelf, regardless of its location. If someone removes it, the central software 73 is notified by the Mini PC 71 of the local control unit at shelf level, which receives notification of the opening of the push button of the guide 24 in which the cage in question was positioned (or is notified by the presence sensor of the RFID reader which no longer "sees" the underlying cage). The central software 73 tracks this event and optionally sends an alarm to the owner in the form of text message, email or telephone call.

A further advantage that can be achieved with the system according to the present invention in which the RFID tag 33 is located on the cover 30b of the cage according to any one of the methods described above with reference to alternative embodiments of the present invention, is that, during normal procedures to open the cage in the change station, the cover is normally rotated through 180° and placed with the outer part on the work surface to avoid contamination between subsequent cages. The RFID tag 33 thus applied to the cover 30b of the cage, as described previously in the possible alternatives, promotes reading by the specific RFID reader, which can thus be positioned simply under the work surface of the change station. The ergonomics of the operations to be carried out by the operator and the reduction in the number of these operations are fundamental parameters when choosing an optimal workflow. The method implemented through the system according to the present invention does not add any further steps by the operator to read the RFID tag 33, but rather enables it to be read automatically by the system.

From the perspective of structure, the shelf described with the system according to the present invention has at least one RFID reader 23 and, in the preferred embodiment, the same number of RFID readers 23 as the number of possible cage positions. Each single RFID reader 23 is preferably embedded in resin transparent to RF (radio frequencies) that protects it during autoclaving and wash cycles. Moreover, in a preferred solution, each RFID reader 23 interfaces on a common bus 72 that connects the various components to the mini PC 71 of the local control unit.

It has thus been shown how the system and the method for automatically detecting the presence of a cage on the shelf of a facility according to the present invention achieves the aims and objects proposed.

The invention claimed is:

1. A system for inventory, position tracking, and management of information relating to animal housing cages for housing laboratory animals, comprising:
    an animal housing cage for housing a laboratory animal, the animal housing cage having a cover and a filtering element inserted in the cover and closed by a filter cover, wherein a radio frequency identification (RFID) tag is disposed between the filtering element and the filter cover of the animal housing cage;
    a shelf defining a plurality of cage seats for receiving the animal housing cage, each of the plurality of cage seats comprising an RFID reader positioned on the shelf below each of the plurality of cage seats to be located proximate the cover of the animal housing cage when the animal housing cage is positioned in any one of the plurality of cage seats;
    a data collection and management computing device for managing data collected by the RFID reader of each of the plurality of cage seats, wherein the data collection and management computing device is configured to automatically detect information associated with the RFID tag of the animal housing cage when the animal housing cage is inserted in any one of the plurality of cage seats of the shelf.

2. The system according to claim 1, wherein said RFID tag is incorporated in an adhesive element which is directly attached to said filtering element.

3. The system according to claim 1, wherein the RFID tag is incorporated in a casing and removably connected to the filter cover.

4. The system according to claim 3, wherein the casing comprises a coupling-release device comprising a pair of prongs insertable into an opening in the filter cover for removably coupling the casing to the filter cover.

5. The system according to claim 4, wherein the coupling-release device provides a snap-fit coupling that removably couples the casing to the filter cover.

6. The system according to claim 1, closed by a filter cover, and wherein said RFID tag is incorporated in a casing which is inserted in a cavity on said filter cover configured to receive said casing.

7. The system according to claim 1 further comprising a local control unit that manages the data collected by the RFID reader of each of the plurality of cage seats, the local control unit being in communication with the data collection and management computing device.

8. The system according to claim 1, further comprising position sensing devices for each of the plurality of cage seats, the position sensing devices configured to detect a correct positioning of the animal housing cage in one of the cage seats of the shelf.

9. The system according to claim 8, wherein each of the plurality of cage seats comprises at least a pair of guides for inserting and supporting the animal housing cage, and wherein the position sensing devices in each of the plurality of the cage seats of the shelf each comprise a switch arranged on at least one of the guides, the switch configured to be pressed only when the animal housing cage is correctly inserted in any one of the plurality of the cage seats of the shelf.

10. The system according to claim 8, wherein the position sensing devices are configured to detect a presence of the animal housing cage in each of the plurality of the cage seats and to send cage presence data to the local control unit.

11. The system according to claim 10 further comprising a visual device configured to signal correct positioning of the animal housing cage inside any one of the plurality of cage seats.

12. The system according to claim 11, wherein the visual device comprises a light emitting diode frontally arranged on at least one of the guides.

* * * * *